United States Patent
Sbaiz et al.

(10) Patent No.: US 9,462,313 B1
(45) Date of Patent: Oct. 4, 2016

(54) PREDICTION OF MEDIA SELECTION CONSUMPTION USING ANALYSIS OF USER BEHAVIOR

(75) Inventors: Luciano Sbaiz, Thalwil (CH); Jesse Berent, Kuesnacht (CH)

(73) Assignee: GOOGLE INC., Mountain View, CA (US)

( * ) Notice: Subject to any disclaimer, the term of this patent is extended or adjusted under 35 U.S.C. 154(b) by 445 days.

(21) Appl. No.: 13/600,640

(22) Filed: Aug. 31, 2012

(51) Int. Cl.
*H04H 60/32* (2008.01)
*H04N 21/258* (2011.01)
*H04H 60/46* (2008.01)
*G06F 3/00* (2006.01)

(52) U.S. Cl.
CPC ........ *H04N 21/25891* (2013.01); *H04H 60/46* (2013.01)

(58) Field of Classification Search
CPC ............................. H04N 21/4312; H04N 5/91
USPC ........... 705/14.55, 14.53; 706/46; 725/5, 14; 715/700
See application file for complete search history.

(56) References Cited

U.S. PATENT DOCUMENTS

| | | | | |
|---|---|---|---|---|
| 2004/0221237 | A1* | 11/2004 | Foote et al. | 715/700 |
| 2007/0136753 | A1* | 6/2007 | Bovenschulte | H04H 60/31 725/46 |
| 2011/0321072 | A1* | 12/2011 | Patterson et al. | 725/5 |
| 2012/0215640 | A1* | 8/2012 | Ramer et al. | 705/14.55 |
| 2012/0271785 | A1* | 10/2012 | Albertson et al. | 706/46 |
| 2013/0073336 | A1* | 3/2013 | Heath | 705/7.29 |
| 2013/0073387 | A1* | 3/2013 | Heath | 705/14.53 |

* cited by examiner

*Primary Examiner* — Dominic D Saltarelli
(74) *Attorney, Agent, or Firm* — Lowenstein Sandler LLP

(57) ABSTRACT

Techniques are shown for predicting the number of times a media selection will be consumed by one or more users at a target time. Examples of user behavior during the consumption of a media selection are chosen as input features. A partitioner separates a set of media selections into a training subset and an evaluation subset. The input features are transformed into feature vectors, and a learned function is derived to define a relationship between the feature vector for the training subset and the number of times a media selection from the training subset is consumed. The learned function is then applied to a feature vector for the evaluation subset to test its accuracy.

28 Claims, 5 Drawing Sheets

PREDICTION OF MEDIA SELECTION CONSUMPTION USING ANALYSIS OF USER BEHAVIOR

BACKGROUND

Video streaming services provide streaming multi-media to end users on an on-demand basis. Accurately predicting the popularity of a video clip may be useful for efficiently allocating network resources and monetizing video content. Database technologies allow for the collection and storage of large amounts of data. Various statistical techniques and machine learning approaches for data analysis allow for extraction of significant amounts of information contained within large data sets.

SUMMARY

Disclosed implementations provide techniques for machine learning or predicting the number of times a media selection will be consumed or experienced by one or more users. Consumption of a media selection can include viewing a video, listening to an audio selection, viewing and listening to an audio-visual selection, and all other means by which a user can experience or enjoy content available over a distributed network or on a computing device. The novel system and techniques disclosed herein determine user behavior during consumption of the media selections in a training subset of media selections, and include different examples of user behavior as representative input features. A learned function is derived to describe the relationship between select input features and a predicted output value. A media selection partitioning utility separates a set of media selections into a training subset of media selections and an evaluation subset of media selections. A training set feature extractor extracts input features from the training subset of media selections, and a training set output value determiner determines the output value corresponding to the select input features. An evaluation set feature extractor also extracts the input features from the evaluation subset of media selections. A feature vector creator transforms the extracted input features from the training subset into a training feature vector, and the extracted input features from the evaluation subset into an evaluation feature vector. A training set learned function derivation utility derives a learned function that defines an accurate relationship between the training feature vector and the output value for the training subset. An evaluation set learned function implementer then runs the learned function on the evaluation feature vector to calculate a predicted output value for the evaluation subset of media selections.

Implementations may include corresponding systems, apparatus, and computer programs, configured to perform the actions of the methods, and encoded on computer storage devices. This Summary is not intended to introduce key features or essential features of the claimed subject matter, but merely provides a selection of concepts that are further described in the Detailed Description. Further implementations, features, and advantages, as well as the structure and operation of the various implementations are described in detail below with reference to accompanying drawings.

BRIEF DESCRIPTION OF THE FIGURES

Implementations are described with reference to the accompanying drawings. In the drawings, like reference numbers may indicate identical or functionally similar elements. The drawing in which an element first appears is generally indicated by the left-most digit in the corresponding reference number.

DESCRIPTION

Figure 1:
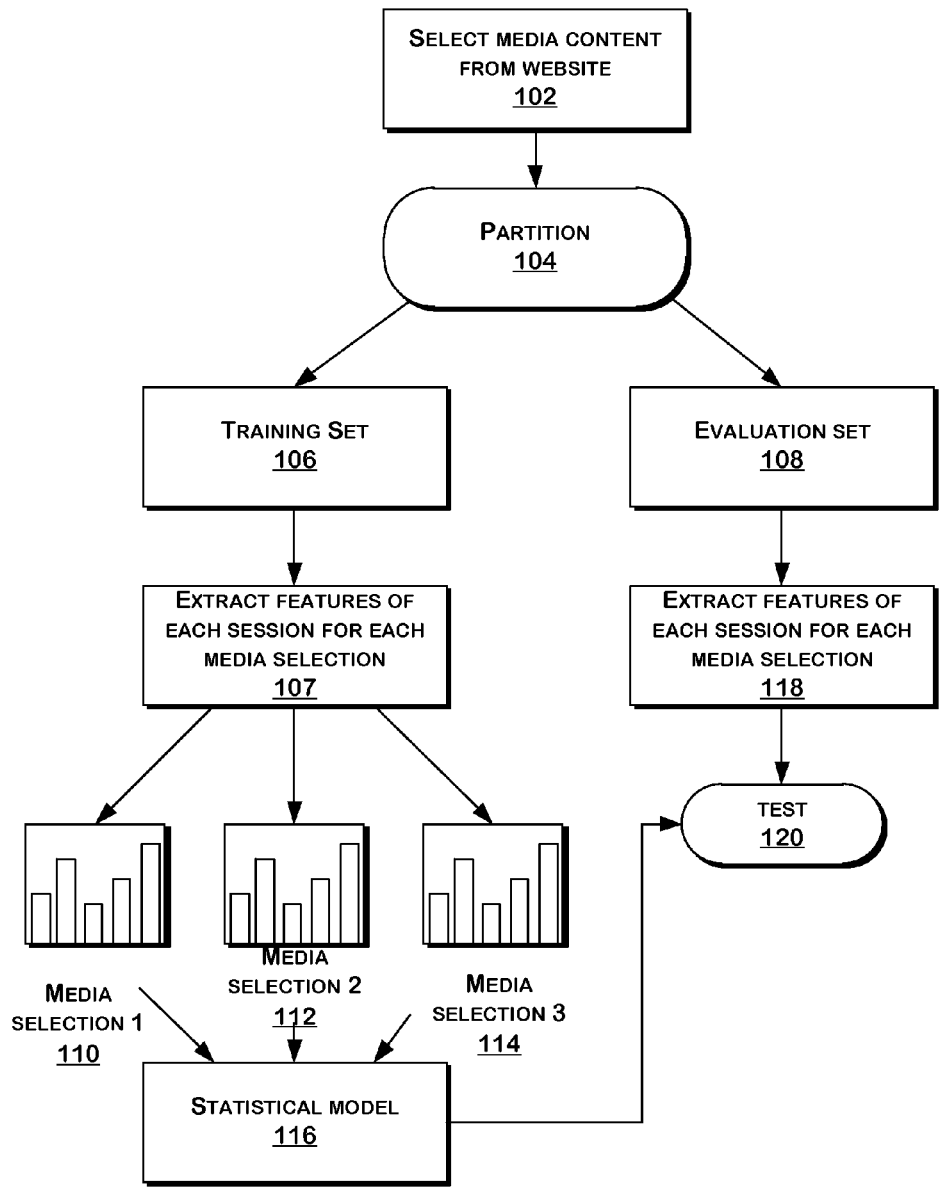
FIG. 1 is a schematic diagram illustrating features in accordance with one implementation of the disclosure.

Efficient allocation of network resources to content with the most user demand enhances the ability and effectiveness of multi-media streaming services in delivering multi-media content over a CDN (Content Delivery Network). A CDN may comprise core server machines on the backbone of the CDN, and edge server machines at the network edge. An edge server machine is located at a node topologically (and perhaps physically) close to its end users. Caching popular video content or other multi-media content near edge server machines can lead to a more rewarding viewer experience.

Accurately predicting the popularity of a video clip or other media selection can be useful in determining which media selection to cache on an edge server machine, and in determining advertising rates associated with the media clip. Viewership or listener prediction may also be useful in setting licensing or royalty rates for licensees to use a popular video clip, audio recording, or other media selection. Throughout this application, reference will be made to views of video clips, but one of ordinary skill in the art will recognize that the same novel principles discussed herein can apply to any user consumption or experiences of any media selections.

Implementations provide a predictor model or learning system to predict the number of views that a video clip may have at a given future target date, target time, or target time period. Although the description herein mentions video clips, the implementations described herein may also find application to other types of media content, such as audio recordings, audio-visual recordings, or other types of files or content, for example computer programs. Various implementations can predict the number of times one or more users consume, or otherwise experience a media selection.

A simple solution to the prediction problem is to use the previous number of views, for instance during the last week of a video clip's life, to predict the number of views at a target date, for example one week from the current date. However, in many cases there are an insufficient number of viewers to be statistically significant for predicting future viewership with a high level of confidence. For example, a video clip may have been recently uploaded to a website, so there may be relatively few views. Also, viewership of a video clip may suddenly and rapidly grow due to a recent propagation of links on social networks and emails, colloquially referred to as viral behavior. Yet the total number of viewers for a viral video clip at some given point in time may not reflect its viral behavior, so that basing prediction simply upon accumulated viewership may not lead to accurate predictor models.

Implementations use information extracted from view sessions of a target video clip, and base viewership prediction on detecting view session patterns. A "view session" as used herein refers to a set of actions taken by a viewer of a video clip while the video clip is being watched. This set of actions may include sharing a video clip over a social media site, searching, going to the home page of the streaming video service, annotating a video clip with comments, viewing a related video clip, reaching the video clip by way of a link on a social media site, clicking on ads within the video clip, rewinding all or a portion of the clip, repeatedly watching the same clip or portions of the clip, and stopping viewing of a clip prematurely, to name just a few examples. For instance, if there are many view sessions where a video clip is played because the viewer followed a link from a social site to the streaming service providing the video clip, then an implementation may predict that the number of views will increase over time because it is expected that many other viewers may soon come by way of the social network.

Implementations include training a classifier or applying regression analysis based on a large number of observations of view sessions and video clips. But implementations are not limited to any particular model, and may include non-linear models. A desired result is to find a classifier, or learned function, that generalizes well, i.e., a function whose performance in estimating the number of views on a training set of video clips from the determined actions taken by a viewer is representative of how well that function will work for estimating the number of views of other as yet unevaluated video clips. More broadly, various implementations include deriving a learned function from input features based on user behavior while consuming a media selection, and a corresponding output feature of a training set of media selections, such as the number of times the media selection is consumed. The learned function is derived from select input features in order to do a good job of generalizing or predicting the desired output value from the input features. The derived learned function is then applied with the select input features from an evaluation set of media selections to determine how well the learned function does at predicting the target output value for those evaluation media selections.

Example Implementation

Referring to FIG. 1, implementations include the selection of a number of video clips from a website 102. These video clips are partitioned 104 into two subsets of video clips: a training subset 106 and an evaluation subset 108. View sessions are analyzed for each set of video clips over some time window of constant duration. This analysis includes extracting features for media selections from the training subset at 107 and for media selections from the evaluation subset at 118. The input features extracted from the media selections are chosen based on their relationship to a desired output value, such as the number of times a media selection is consumed by users.

The following are examples of features of a view session: the number of events in the view session, where an event may include a viewer action such as a search, mouse click, etc.; the number of video clips played in a session in which the target video clip is included; how many times, if any, the target video clip was rewound or otherwise watched repeatedly; whether viewing of the video clip was ended prematurely; the position of the target video clip within a session of played video clips; the type of video play, such as for example if the video clip was played after a search, as a related video, following a link from a third party site, or the URL (Uniform Resource Locator) of the third party site that brought the viewer to the video streaming service, annotations entered by a user, to name a few examples, where a numerical value is chosen for each type; and the time of day, or perhaps the day of the week, during which the video clip is played.

Other features may be useful. For example, audio-visual features capturing the content, e.g., color histogram, motion detection, audio spectrogram, etc. Features may be extracted from metadata in the video clip file, or from viewer demographics. As several non-limiting examples, testing may reveal that video clips with a high percentage of scenes having a lot of action are likely to have a higher number of views, or clips with brighter colors are likely to have a higher number of views, or clips with scenes including famous or recognizable personalities are likely to have a higher number of views, etc.

The quantities introduced to characterize the data that is input into a learning system such as is described herein are referred to as "features". In various implementations of this disclosure, the number of features selected and evaluated for patterns that may help in predicting future behavior can be kept to the smallest set of features that still conveys enough information to provide an accurate prediction. To avoid data overfitting, such as can arise when the number of features is too large, and a number of training patterns is comparatively small, the techniques of regularization and dimensionality reduction of the feature space can be applied.

The numerical values for the above described features associated with a video clip may be normalized by the number of sessions. For ease of discussion, the resulting normalized features will simply be referred to as features rather than as normalized features, it being understood that normalization may have been performed.

Extracting features provides a vector for each video clip, where the components of the vector are values of the features. Thus, features for each video clip make up a feature vector. A feature vector is an n-dimensional vector of numerical features that are chosen to represent an object, such as the above-described features chosen to represent a view session. The numerical representations facilitate processing and statistical analysis in attempting to recognize patterns in the representative features. This feature vector may be visualized as a histogram, where for example three histograms labeled 110, 112, and 114 are pictorially illustrated in FIG. 1, one histogram for each video clip. Of course, in practice, it is expected that many more than three video clips will be chosen for the training set.

The number of components of the feature vector may be viewed as the number of dimensions of a space, which may be termed the feature space. The training procedure of a classifier determines a partition of the feature space in subsets. The way in which this space is divided defines the particular training classification that an implementation employs. Each sub-space is a classification, where associated with each sub-space is the average number of viewers that actually watched a video clip at some fixed time in the future from when the features were extracted (the target time), where the feature vector of the video clip belongs to that sub-space. The number of viewers is known because these video clips are from a training set.

Other implementations may construct a linear regression model in which a vector is estimated so that the inner product of this vector with the feature vector provides an estimate of the number of viewers. This vector may be estimated by performing a least squares fit, for example.

Models other than linear regression and classification may be used to predict the number of viewers based upon a feature vector. For example, non-linear models may be employed where various products of the entrie of the feature vector may be formed and then appended to the feature vector to provide a vector of larger dimension. Then, classification or linear regression may be applied to this higher dimensioned vector. Kernel methods allow the applied model to implement efficiently this procedure of feature expansion. Typical kernels include polynomial kernels, Radial Basis Functions, hyperbolic tangent, and so forth.

In general, the statistical model for expressing the number of viewers or number of views (the dependent variable) as a learned function of the components of the feature vector (the independent variables) is represented by the box labeled 116.

Feature extraction 118 is also applied to video clips in the evaluation subset. The statistical model 116 developed for the training subset may then be applied to the feature vectors for test 120. The evaluation set is used to evaluate the performance of the predictor model. One way to do this is to measure the mean squared error of the predictions for the samples in the evaluation set (in the case of regression) or the probability of predicting the correct subset (in the case of classification). It is also possible to use the evaluation set to train a second predictor model that predicts the error magnitude. This is trained using the methods previously described, but with predicting the quadratic error (or some other error function) instead of the number of views.

The type of learning or prediction that is performed in various implementations can be referred to as supervised learning. Supervised learning is a machine learning task of inferring a function from labeled training data. The training data in various implementations of this disclosure can consist of sets of training examples, where each example is a pair of an input object and a desired output value. The input object can be the feature vector described above, wherein the feature vector is an n-dimensional vector of numerical features that are chosen to represent an object, such as the above-described features chosen to represent a view session. In the case where a histogram is used to represent the feature vector for each video, such as shown in FIG. 1, each bar of a histogram can represent the numerical value of a separate component of the view session. This input object can be represented as the vector "h_i". The desired output value paired with the input object is the number of views of the video at a target time, and can be represented by the vector "n_i".

A supervised learning procedure can analyze the training subset 106 and produce a learned function, which is called a classifier if the output is discrete, or a regression function if the output is continuous. The learned function is selected in order to correctly predict the correct output value n_i for any valid input object h_i. The learning procedure therefore generalizes from the training subset 106 and can be tested on the separate evaluation subset 108.

Example Implementation and Technique

Figure 2:
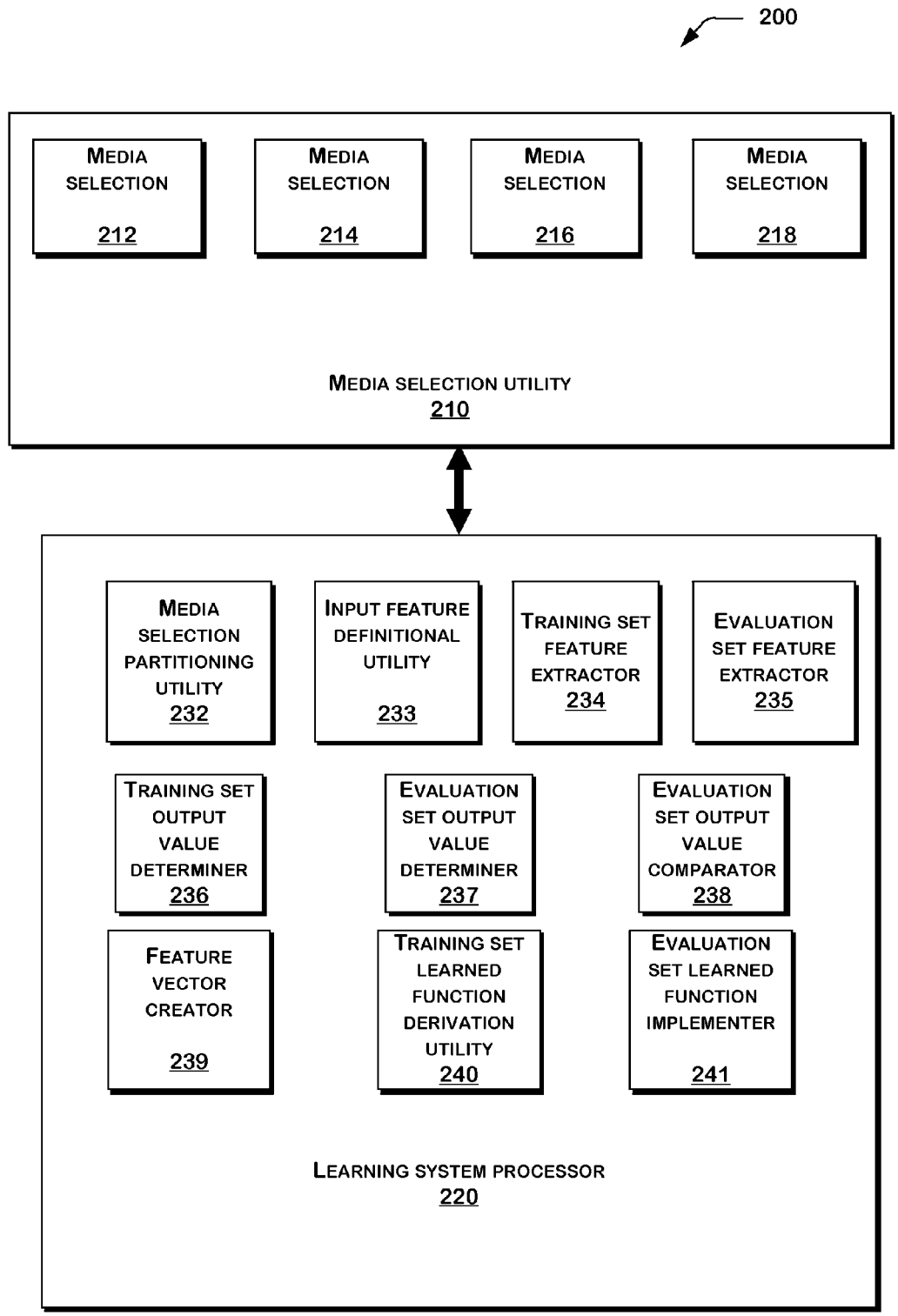
FIG. 2 is a block diagram illustrating features in accordance with an implementation of the disclosure.

FIG. 2 illustrates an implementation having a media selection utility 210 and a learning system processor 220. Although these components are illustrated with separate high-level blocks, at least a portion of these components could be combined, or contained on one or more servers communicatively coupled to a client device, or in some instances at least a portion of these components may be contained on one or more client devices that could be communicatively coupled in a peer-to-peer (P2P) configuration.

The media selection utility 210 can retrieve media selections 212, 214, 216, and 218 from local or remote sources, such as from various content providing web sites over the Internet, or from databases contained on local servers, or client devices.

The media selections can then be sent to the learning system processor 220, which can be provided as one or more discrete computing components on one or more servers communicatively coupled to a particular client device, or on one or more client devices. The learning system processor 220 includes a media selection partitioning utility 232, input feature definitional utility 233, training set feature extractor 234, evaluation set feature extractor 235, training set output value determiner 236, evaluation set output value determiner 237, evaluation set output value comparator 238, feature vector creator 239, training set learned function derivation utility 240, and evaluation set learned function implementer 241.

Figure 3:
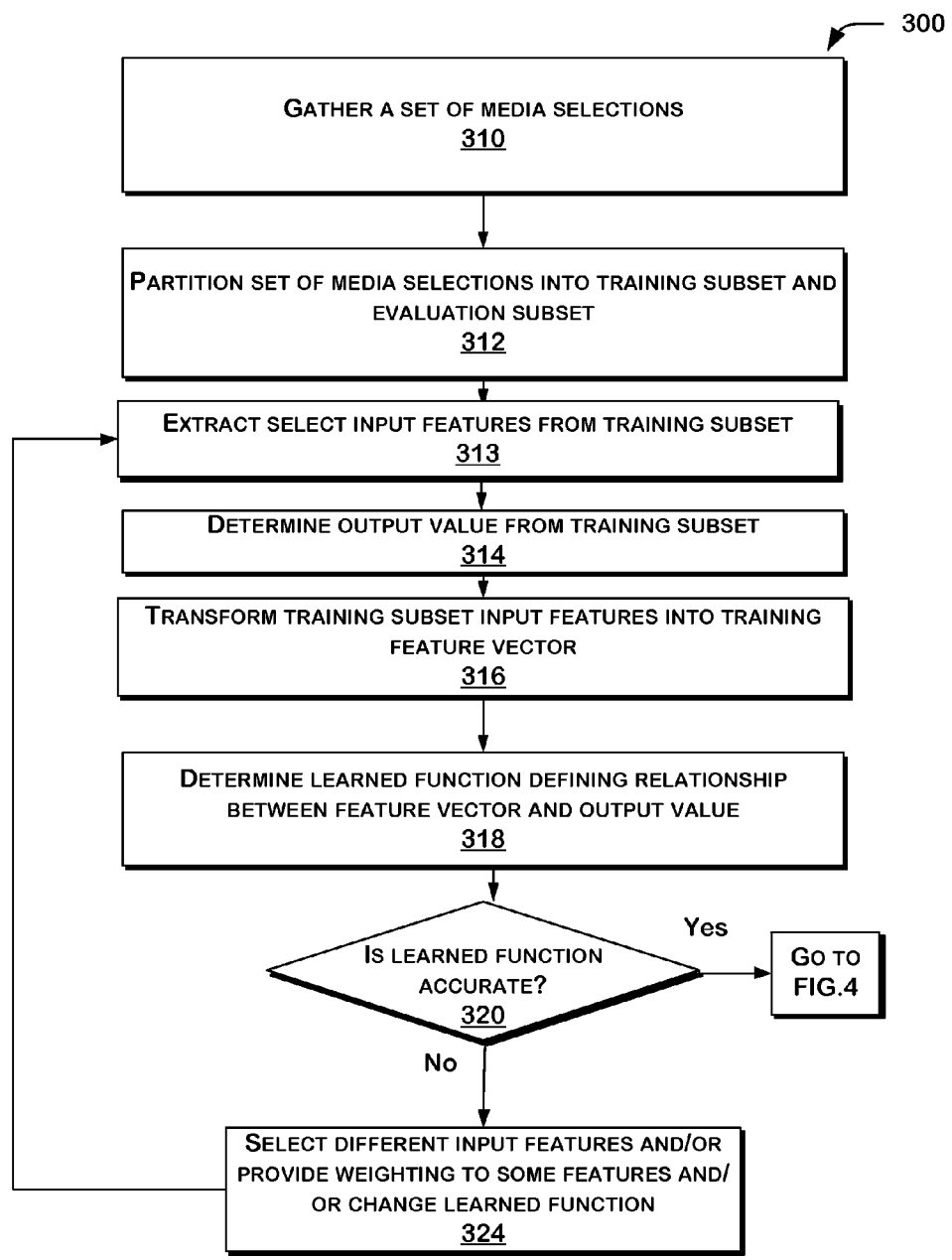
FIG. 3 is a flow chart illustrating techniques in accordance with an implementation of the disclosure.

Referring also to FIG. 3, a set of techniques 300 in accordance with various implementations includes the media selection utility gathering a set of media selections 310, such as video clips, audio recordings, audio-visual recordings, or other content.

At 312 the media selection partitioning utility partitions the set of media selections into a training subset of media selections and an evaluation subset of media selections. In various implementations, the partitioning utility can partition the selections from one or more time intervals, from local or remote sources, or using other methods of segregating the set of media selections.

At 313 a training set feature extractor extracts input features that have been defined by an input feature definitional utility from the training subset of media selections. As discussed above, these input features are types of user behavior that can be parameterized and evaluated using a learned function to determine their ability to predict a desired output value such as the number of times a media selection will be consumed at a certain future target date or time period.

At 314 a training set output value determiner determines the output value for the media selections in the training subset. Examples of the output values that could be determined include the number of times a video clip from the training subset of media selections is watched, the number of times an audio recording is listened to, or the number of times an audio-visual recording is watched and listened to.

At 316 a feature vector creator transforms the extracted features from the training subset into a training feature vector. As discussed above, a feature vector is an n-dimensional vector of numerical features that represent some object. In various disclosed implementations these features can include examples of user behavior such as the number of clicks on links a user makes while consuming the media selection, the number of searches conducted by a user from within the selection, annotations made by the user while consuming a media selection, whether the user shares the media selection through a social networking site, or arrives at the media selection from a link on a social networking site or provided in an email, the number of times the user consumes the selection, such as the number of times the user watches a video clip, or perhaps leaves a video clip or other media selection prematurely, etc.

At 318 a training set learned function derivation utility determines a learned function that defines the relationship between the training feature vector and the output value for the media selections in the training subset.

At 320 the output value derived from the training feature vector using the learned function can be compared to the actual output value, and a decision can be made regarding whether the predicted output value is within a predetermined error threshold from the actual output value. If the predicted output value is close enough, and the learned function is determined to be accurate enough, a set of techniques 400, illustrated in FIG. 4, can be implemented for the evaluation subset of media selections.

At 324, if the learned function derived from the training subset of media selections is not accurate enough, or a relationship cannot be derived from the extracted input features, different input features representative of other user behavior can be selected, weighting factors can be provided to modify the significance of certain behaviors, or the entire learned function can be changed.

Figure 4:
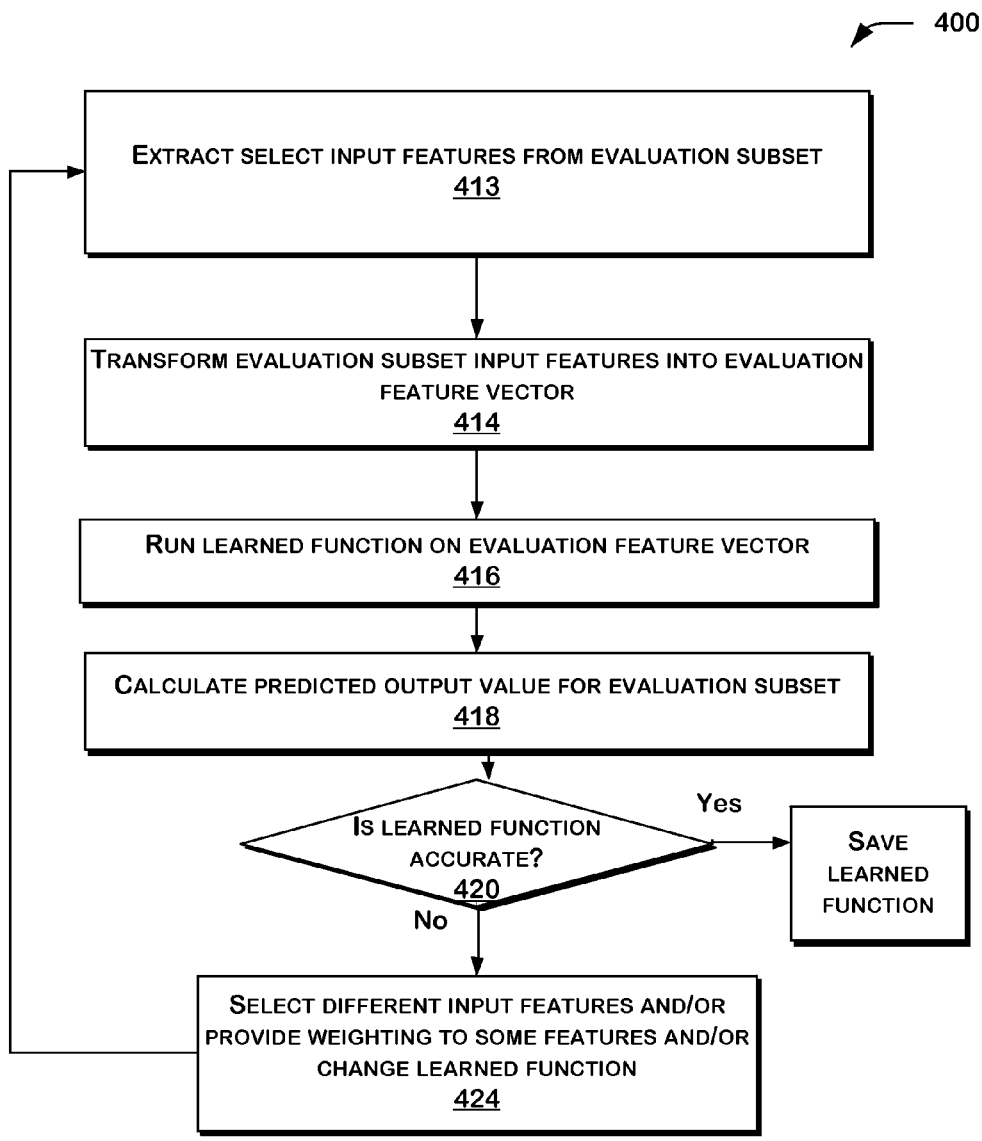
FIG. 4 is a flow chart illustrating techniques in accordance with an implementation of the disclosure.

Referring to FIG. 4, the techniques 400 start with extracting input features from the evaluation subset of media selections at 413. The extracted input features are the same input features as were extracted from the training subset of media selections at 313 in FIG. 3.

At 414 a feature vector creator transforms the evaluation subset input features into an evaluation feature vector.

At 416 the learned function that was derived from the input features and output value for media selections in the training subset, is applied to the evaluation feature vector.

At 418 the output value for the evaluation subset media selections is calculated by running the learned function on the evaluation feature vector.

At 420 an evaluation set output value comparator compares the predicted output value derived using the learned function with the actual output value for the evaluation subset media selections. If the comparison yields results that are within a predetermined error threshold, the learned function is retained for prediction. If the comparison shows that the learned function is not accurate enough, at 424 a number of different modifications can be made including, but not limited to, selection of different input features, adding or changing the weight given to certain input features, or changing the learned function.

Implementations of the disclosure may include a method on a machine, a system or apparatus as part of or in relation to the machine, or a computer program product embodied in a computer readable medium executing on one or more of the machines. The one or more processors may be part of a server, client, network infrastructure, mobile computing platform, stationary computing platform, or other computing platform.

A processor may be any kind of computational or processing device capable of executing program instructions, codes, binary instructions and the like. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

Figure 5:
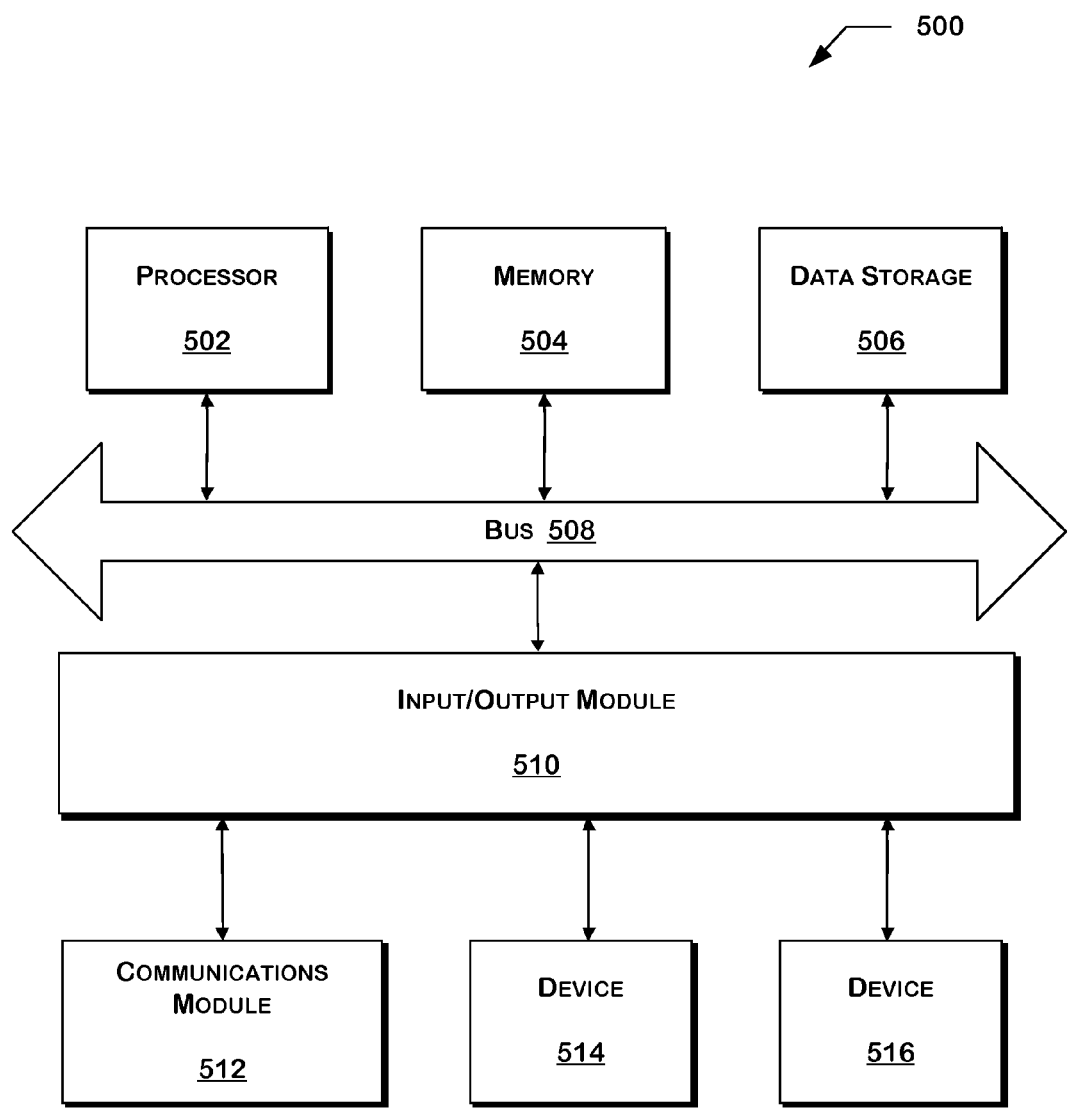
FIG. 5 is a schematic diagram of an exemplary computer system employed in accordance with one or more implementations of the disclosure.

FIG. 5 is a block diagram illustrating an exemplary computer system 500 with which the components of FIG. 2 and techniques of FIGS. 1, 3, and 4 can be implemented. In certain aspects, the computer system 500 may be implemented using hardware or a combination of software and hardware, either in a dedicated server, or integrated into another entity, or distributed across multiple entities.

Computer system 500 includes a bus 508 or other communication mechanism for communicating information, and a processor 502 coupled with bus 508 for processing information. By way of example, the computer system 500 may be implemented with one or more processors 502.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, logic circuitry.

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more location without deviating from the scope of the disclosed subject matter. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various techniques identified and described above may be varied, and that the order of techniques may be adapted to particular applications of the techniques disclosed herein. All such variations and modifications are intended to fall within the scope of this disclosure. As such, the depiction and/or description of an order for various techniques should not be understood to require a particular order of execution for those techniques, unless required by a particular application, or explicitly stated or otherwise clear from the context.

The methods and/or processes described above, and techniques thereof, may be realized in hardware, or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python).

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 include networking interface cards, such as Ethernet cards and modems. In certain aspects, the input/output module 510 is configured to connect to a plurality of devices, such as an input device 514 and/or an output device 516. Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a CRT (cathode ray tube) or LCD (liquid crystal display) monitor, for displaying information to the user.

According to one aspect of the present disclosure, the learning system 200, as shown in FIG. 2, can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process s described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication networks can include, but are not limited to, for example, any one or more of the following network topologies, including a bus network, a star network, a ring network, a mesh network, a star-bus network, tree or hierarchical network, or the like. The communications modules can be, for example, modems or Ethernet cards.

As discussed above, computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, an enterprise server or group of servers, one or more desktop computers, one or more laptop computers, etc. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable media" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate embodiments or implementations can also be implemented in combination in a single embodiment or implementation. Conversely, various features that are described in the context of a single embodiment or implementation can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

In the claims appended herein, the inventor invokes 35 U.S.C. §112, paragraph 6 only when the words "means for" or "steps for" are used in the claim. If such words are not used in a claim, then the inventor does not intend for the claim to be construed to cover the corresponding structure, material, or acts described herein (and equivalents thereof) in accordance with 35 U.S.C. §112, paragraph 6.

What is claimed is:

1. A method of facilitating prediction of a number of times a selection of media content will be consumed by one or more users at a target time, the method comprising:
   identifying a set of media selections;
   selecting a plurality of input features, the input features comprising examples of user behavior occurred during consumption of the identified set of media selections;
   separating the identified set of media selections into a training set and an evaluation set;
   upon separating the identified set of media selections into the training set and the evaluation set, transforming selected input features from the plurality of input features into a training set feature vector corresponding to a media selection from the training set, the training set feature vector comprising features descriptive of the user behavior during consumption of the media selection from the training set;
   deriving a learned function defining a relationship between the training set feature vector corresponding to the media selection from the training set and a number of times the media selection from the training set is consumed at the target time; and
   applying the learned function to a feature vector of input features from a media selection from the evaluation set to predict the number of times the media selection from the evaluation set is to be consumed at the target time.

2. The method according to claim 1, wherein:
the selecting examples of user behavior as input features comprises one or more of selecting the number of searches for other information conducted by a user during consumption of the media selection, selecting the number of times a user clicks on one or more links within the media selection, selecting the total number of media selections a user consumes during a time frame, selecting where in a series of media selections being consumed by a user the media selection is located, selecting whether the media selection was discovered by a user as a result of following a link from a social media site, selecting whether the media selection was discovered by a user as a result of a referral received by email, selecting whether the media selection was discovered independently by a user, selecting whether the media selection was consumed repeatedly by a particular user, selecting whether consumption of the media selection was ended prematurely as a result of a selection by a user to end consumption, or selecting whether a user makes annotations or performs other inputs during or following consumption of the media selection.

3. A method of facilitating prediction of an output value regarding a set of media selections consumed by one or more users, the method comprising:
determining a plurality of input features, the input features comprising examples of user behavior occurred during consumption of one or more media selections from the set of media selections;
selecting input features from the determined examples of user behavior to include in a learned function for predicting an output value from the selected input features;
partitioning the set of media selections into a training subset of media selections and an evaluation subset of media selections prior to determining a learned function for the prediction;
extracting the selected input features from the training subset of media selections;
determining an output value from the training subset;
transforming the extracted training subset input features into a training feature vector corresponding to a media selection from the training subset, the training feature vector containing multiple features descriptive of the user behavior during consumption of the media selection from the training subset;
determining the learned function that defines a relationship between the training feature vector corresponding to the media selection from the training subset and the output value from the training subset;
extracting the selected input features from the evaluation subset of media selections;
transforming the extracted evaluation subset input features into an evaluation feature vector containing multiple features descriptive of the user behavior during consumption of the media selections in the evaluation subset; and
applying the learned function to the evaluation feature vector to calculate a predicted output value for the evaluation subset of media selections.

4. The method according to claim 3, wherein:
the predicted output value for the evaluation subset of media selections is the number of times one or more media selections from the evaluation subset will be consumed by one or more users at a future target time.

5. The method according to claim 3, further comprising:
comparing the predicted output value for the evaluation subset of media selections to a measurement of the actual value of the output at the target time; and
determining whether the predicted output value is within a predetermined error threshold from the actual value of the output to evaluate performance of the learned function.

6. The method according to claim 3, wherein:
the determining examples of user behavior to include as representative input features comprises one or more of determining the number of searches for other information conducted by a user during consumption of the media selection, determining the number of times a user clicks on one or more links within the media selection, determining the total number of media selections a user consumes during a time frame, determining where in a series of media selections being consumed by a user the media selection is located, determining whether the media selection was discovered by a user as a result of following a link from a social media site, determining whether the media selection was discovered by a user as a result of a referral received by email, determining whether the media selection was discovered independently by a user, determining whether the media selection was consumed repeatedly by a particular user, determine whether consumption of the media selection was ended prematurely as a result of a selection by a user to end consumption, or determining whether a user makes annotations or performs other inputs during or following consumption of the media selection.

7. The method according to claim 3, wherein:
the media selections comprise video selections, and consumption of the media selections comprises viewing of the video selections.

8. The method according to claim 3, wherein:
the media selections comprise audio recordings, and consumption of the media selections comprises listening to the audio recordings.

9. The method according to claim 3, wherein:
the media selections comprise audio-visual recordings, and consumption of the media selections comprises watching and listening to the audio-visual recordings.

10. The method according to claim 3, wherein:
the transforming training subset input features into a training feature vector comprises aggregating all input features for all sessions of the same media selection.

11. The method according to claim 3, wherein:
the determining a learned function comprises classification wherein input features are categorized in accordance with their determined effect on the determined output value.

12. The method according to claim 3, wherein:
the determining a learned function comprises regression analysis wherein a determination is made of the amount the determined output value changes for a variance in one or more of the input features.

13. The method according to claim 3, wherein:
the determining a learned function comprises a consideration of the kind of information included in the extracted input features, wherein the kind of information can be one of integer-valued information, real-valued information, categorical information, or continuous information.

14. The method according to claim 3, wherein:
the determining a learned function comprises including different weightings for some of the extracted input features.

15. The method according to claim 3, wherein:
the determining a learned function comprises including consideration of any observable interactions between the extracted input features.

16. The method according to claim 3, further comprising:
the training subset of media selections and the evaluation subset of media selections are collected from one or more of local sources, remote sources, simultaneously, at different times, manually, or automatically.

17. A system for predicting the number of times a selection of media from a set of media selections will be consumed by one or more users at a future target time, the system comprising:
a processing device; and
a memory, coupled to the processing device, the memory to store:
a media selection utility configured to select a representative set of media selections for training and evaluation;
a media selection partitioning utility configured to partition the set of media selections into a training subset of media selections and an evaluation subset of media selections prior to determining a learned function for the predicting;
an input feature definitional utility configured to identify a plurality of input features, the input features comprising examples of user behavior occurring during consumption of the representative set of media selections, the input features for use in predicting the number of times a selection of media will be consumed by users;
a training set feature extractor configured to extract input features from the training subset of media selections;
a training set output value determiner configured to determine an output value from the training subset of media selections;
a feature vector creator configured to transform the extracted training subset input features into a training feature vector corresponding to a media selection from the training subset, the training feature vector containing multiple features descriptive of the user behavior during consumption of the media selection from the training subset;
a training set learned function derivation utility configured to determine the learned function that defines a relationship between the training feature vector corresponding to the media selection from the training subset and the determined output value from the training subset; and
an evaluation set learned function implementer configured to run the learned function on an evaluation feature vector and calculate a predicted output value for the evaluation subset of media selections.

18. The system according to claim 17, further comprising:
an evaluation set feature extractor configured to extract select input features from the evaluation subset of media selections; and
the feature vector creator further configured to transform the extracted evaluation subset input features into the evaluation feature vector containing multiple features descriptive of the user behavior during consumption of the media selections in the evaluation subset.

19. The system according to claim 18, further comprising:
an evaluation set output value comparator configured to compare the predicted output value for the evaluation subset of media selections to an actual measured output value for the evaluation subset of media selections to evaluate performance of the learned function.

20. The system according to claim 17, wherein:
the input feature definitional utility is configured to identify examples of user behavior during consumption of media selections as input features, wherein the examples of user behavior comprise one or more of the number of searches for other information conducted by a user during consumption of the media selection, the number of times a user clicks on links within the media selection, the total number of media selections a user consumes during a time frame, where in a series of media selections being consumed by a user the media selection is located, whether the media selection was discovered by a user as a result of following a link from a social media site, whether the media selection was discovered by a user as a result of a referral received by email, whether the media selection was discovered independently by a user, whether the media selection was consumed repeatedly by a particular user, whether consumption of the media selection was ended prematurely as a result of a selection by a user to end consumption, or whether a user makes annotations or performs other inputs during or following consumption of the media selection.

21. The system according to claim 17, wherein:
the media selection utility is configured to select video clips for viewing by users.

22. The system according to claim 17, wherein:
the media selection utility is configured to select audio recordings for listening by users.

23. The system according to claim 17, wherein:
the media selection utility is configured to select audio-visual recordings for viewing and listening to by users.

24. A non-transitory computer-readable media storing instructions that, when executed by a computing device, cause the computing device to perform operations that facilitate prediction of the number of times a selection of media from a set of media selections will be consumed by one or more users at a future target time, the operations comprising:
determining a plurality of input features, the input features comprising examples of user behavior occurring during consumption of the media selection;
selecting input features from the determined examples of user behavior to include in a learned function for predicting the number of times a selection of media will be consumed by one or more users at a target time;
partitioning the set of media selections into a training subset of media selections and an evaluation subset of media selections prior to determining a learned function for the prediction;
extracting the select input features from the training subset of media selections;
determining the number of times a media selection from the training subset of media selections is actually consumed by one or more users at a target time;
transforming the extracted training subset input features into a training feature vector corresponding to a media selection from the training subset, the training feature vector containing multiple features descriptive of the user behavior during consumption of the media selection from the training subset;

determining the learned function that defines a relationship between the training feature vector corresponding to the media selection from the training subset and the determined number of times a media selection from the training subset is consumed at a target time;

extracting the select input features from the evaluation subset of media selections;

transforming the extracted evaluation subset input features into an evaluation feature vector containing multiple features descriptive of the user behavior during consumption of the media selections in the evaluation subset; and applying the learned function to the evaluation feature vector to calculate a predicted number of times a media selection from the evaluation subset of media selections will be consumed by one or more users at a target time.

25. The non-transitory computer-readable media according to claim 24, the operations further comprising:

the determining examples of user behavior to include as representative input features comprises one or more of determining the number of searches for other information conducted by a user during consumption of the media selection, determining the number of times a user clicks on links within the media selection, determining the total number of media selections a user consumes during a time frame, determining where in a series of media selections being consumed by a user the media selection is located, determining whether the media selection was discovered by a user as a result of following a link from a social media site, determining whether the media selection was discovered by a user as a result of a referral received by email, determining whether the media selection was discovered independently by a user, determining whether the media selection was consumed repeatedly by a particular user, determine whether consumption of the media selection was ended prematurely as a result of a selection by a user to end consumption, or determining whether a user makes annotations or performs other inputs during or following consumption of the media selection.

26. The non-transitory computer-readable media according to claim 24 storing instructions that, when executed by a computing device, cause the computing device to perform operations that facilitate predicting the number of times a video selection from a set of video selections will be viewed by one or more users.

27. The non-transitory computer-readable media according to claim 24 storing instructions that, when executed by a computing device, cause the computing device to perform operations that facilitate predicting the number of times an audio recording from a set of audio recordings will be listened to by one or more users.

28. The non-transitory computer-readable media according to claim 24 storing instructions that, when executed by a computing device, cause the computing device to perform operations that facilitate predicting the number of times an audio-visual recording from a set of audio-visual recordings will be viewed and listened to by one or more users.

* * * * *